US010878166B1

(12) United States Patent
Wang et al.

(10) Patent No.: US 10,878,166 B1
(45) Date of Patent: Dec. 29, 2020

(54) SELF-ORGANIZED SNAPPING FOR REPEATER PLANNING

(71) Applicant: Synopsys, Inc., Mountain View, CA (US)

(72) Inventors: Kai-Ping Wang, Fremont, CA (US); Haiying Liu, Sunnyvale, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 16/594,914

(22) Filed: Oct. 7, 2019

Related U.S. Application Data

(60) Provisional application No. 62/742,515, filed on Oct. 8, 2018.

(51) Int. Cl.
*G06F 30/30* (2020.01)
*G06F 30/398* (2020.01)
*G06F 111/20* (2020.01)
*G06F 119/08* (2020.01)

(52) U.S. Cl.
CPC ........ *G06F 30/398* (2020.01); *G06F 2111/20* (2020.01); *G06F 2119/08* (2020.01)

(58) Field of Classification Search
CPC . G06F 30/398; G06F 2119/08; G06F 2111/20

USPC ........................................................ 716/114
See application file for complete search history.

(56) References Cited

U.S. PATENT DOCUMENTS

| | | | | |
|---|---|---|---|---|
| 6,898,774 | B2 * | 5/2005 | Alpert | G06F 30/394 |
| | | | | 716/114 |
| 7,010,767 | B2 * | 3/2006 | Elassaad | G06F 30/392 |
| | | | | 716/114 |

* cited by examiner

*Primary Examiner* — Jack Chiang
*Assistant Examiner* — Brandon Bowers
(74) *Attorney, Agent, or Firm* — Park, Vaughan, Fleming & Dowler LLP; Laxman Sahasrabuddhe

(57) ABSTRACT

Techniques and systems for inserting repeaters in an integrated circuit (IC) design are described. Some embodiments can place a snapping region in the IC design, wherein the snapping region includes a predetermined arrangement of feasible grid regions and blocked grid regions, and wherein repeaters are allowed to be placed in feasible grid regions but not in blocked grid regions. Next, the embodiments can iteratively perform a set of operations, comprising: selecting a net from a set of nets; determining an initial location for inserting a repeater in the net; identifying an unoccupied feasible grid region in the first snapping region that is closest to the initial location; and inserting a repeater in the net in the unoccupied feasible grid region.

20 Claims, 9 Drawing Sheets

SELF-ORGANIZED SNAPPING FOR REPEATER PLANNING

RELATED APPLICATION

This application claims benefit of U.S. Provisional Application Ser. No. 62/742,515, filed on 8 Oct. 2018, the contents of which are herein incorporated by reference in their entirety for all purposes.

COPYRIGHT NOTICE

The assignee of this patent document does not object to the facsimile reproduction of the patent document as it appears in the files of the United States Patent and Trademark Office, but otherwise reserves all rights whatsoever in any included works of authorship protected by copyright.

BACKGROUND

Technical Field

This disclosure relates to integrated circuit (IC) design. More specifically, this disclosure relates to self-organized snapping for repeater planning.

Related Art

Advances in process technology have fueled a rapid increase in the size and complexity of IC designs. This dramatic increase in complexity and integration densities has made it considerably more challenging to design ICs. In particular, repeater planning for top-level high-speed connections has become a difficult challenge. Repeater planning is an important step to ensure that the timing of the high-speed interconnect can be met. In electronic design automation (EDA), on-route repeater (buffer or inverter pairs) insertion is an effective way to help the IC designer to meet the timing requirements.

However, repeater planning can be very challenging when a group of high-speed interconnects (buses) have the same timing constraints. In such situations, the IC designer has to ensure that each net (bit) in the group of high-speed interconnects (bus) has a similar delay, and reaches the targeted pin at the same time.

SUMMARY

This section is not intended to limit the scope of the disclosed subject matter. The disclosed subject matter is to be accorded the widest scope consistent with the principles and features disclosed in the entire disclosure. Some embodiments described herein provide systems and techniques for inserting repeaters in IC design.

During operation, some embodiments can place a first snapping region in the IC design, wherein the first snapping region includes a predetermined arrangement of feasible grid regions and blocked grid regions, and wherein repeaters are allowed to be placed in feasible grid regions but not in blocked grid regions. Next, the embodiments can iteratively perform a set of operations, comprising: (1) selecting a net from a set of nets; (2) determining an initial location for inserting a repeater in the net; (3) identifying an unoccupied feasible grid region in the first snapping region that is closest to the initial location; and (4) inserting a repeater in the net in the unoccupied feasible grid region.

In some embodiments, the set of nets represent a bus interconnect in the IC design. In some embodiments, the first snapping region is placed where the bus interconnect is routed. In some embodiments, the first snapping region is placed in a channel that does not overlap with macros in the IC design.

In some embodiments, once a repeater is placed in an unoccupied feasible grid region, the unoccupied feasible grid region is treated as a blocked grid region in subsequent iterations.

In some embodiments, a second snapping region is placed that at least partially overlaps with the first snapping region. Once a repeater is placed in an unoccupied feasible grid region in the first snapping region, all feasible grid regions in the second snapping region that overlap with the unoccupied feasible grid region in the first snapping region are treated as blocked grid regions in subsequent iterations.

In some embodiments, the net is split into a first net and a second net, wherein the first net is electrically connected to an input of the repeater, and wherein the second net is electrically connected to an output of the repeater.

DETAILED DESCRIPTION

Figure 1:
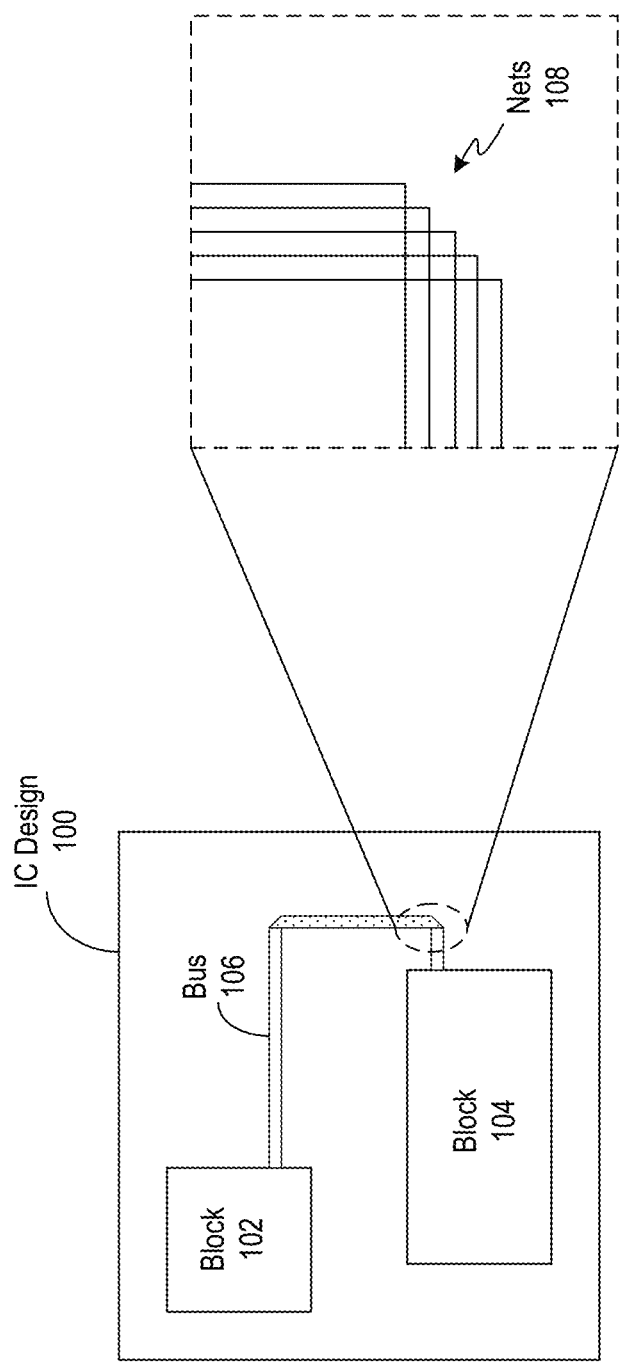
FIG. 1 illustrates a bus in accordance with some embodiments described herein.

The following description is presented to enable any person skilled in the art to make and use the claimed invention(s), and is provided in the context of particular application(s) and/or environment(s). Various modifications to the disclosed embodiments will be readily apparent to those skilled in the art, and the general principles defined herein may be applied to other embodiments and applications without departing from the spirit and scope of the disclosure. Thus, the disclosed subject matter is not limited to the embodiments shown, but is to be accorded the widest scope consistent with the principles and features disclosed herein.

In this disclosure, numerous specific details may be described to enable one or more of the embodiments. In the interest of not obscuring the presentation of the embodiments, some features that are known in the art may be combined together, may be described in less detail, or may be implied (i.e., some well-known features may not be explicitly described). Furthermore, while this description may refer to some features in the singular tense, more than one instance of the feature may be illustrated in the figures, and like components are labeled with like numerals.

An IC design and manufacturing process produces IC chips. IC design software tools can be used to create an IC design. Once the IC design is finalized, it can undergo fabrication, packaging, and assembly to produce IC chips. The overall IC design and manufacturing process can involve multiple entities, e.g., one company may create the software for designing ICs, another company may use the software to create the IC design, and yet another company may manufacture IC chips based on the IC design. An IC design flow can include multiple steps, and each step can involve using one or more IC design software tools. An improvement to one or more of these steps in the IC design flow results in an improvement to the overall IC design and manufacturing process. Specifically, the improved IC design and manufacturing process can produce IC chips with a shorter time-to-market (TTM) and/or higher quality of results.

As an IC design progresses through an IC design flow, the IC design can be represented at different levels of abstraction by using different data formats or languages. In general, higher levels of abstraction contain fewer details of the IC design than lower levels of abstraction. Typically, the IC design is described at a high level of abstraction in the early stages of the IC design flow, and the level of abstraction becomes progressively lower as the IC design moves through the IC design flow (i.e., the description of the IC design becomes more specific as the IC design progresses through the IC design flow).

For example, toward the beginning of the IC design flow, an IC design can be described at a high level of abstraction by using a hardware description language (HDL) which describes the functionality of the IC design but does not include information about the actual geometric shapes that will be printed on the wafer. Toward the end of the IC design flow, the same IC design can be represented in a low level of abstraction by using a data format or language such as GDSII or OASIS, which contains a description of the actual geometric shapes that are to be printed on the wafer. In between these two ends of the IC design flow, the IC design may be represented in numerous data formats or languages that describe the same IC design at different levels of abstraction.

Some examples of IC design steps and the associated software tools are described below. These examples are for illustrative purposes only and are not intended to limit the embodiments to the forms disclosed. This disclosure describes techniques and systems that can be used in one or more IC design steps.

IC design software tools enable IC designers to describe the functionality that the IC designers want to implement. These tools also enable IC designers to perform what-if planning to refine functionality, check costs, etc. During logic design and functional verification, the HDL, e.g., SystemVerilog, code can be written and the design can be checked for functional accuracy, e.g., the design can be checked to ensure that it produces the correct outputs.

During synthesis and design for test, the HDL code can be translated to a netlist using one or more IC design software tools. Further, the netlist can be optimized for the target technology, and tests can be designed and implemented to check the finished chips. During netlist verification, the netlist can be checked for compliance with timing constraints and for correspondence (i.e., equivalence checking) with the RTL design and/or HDL code.

During design planning, an overall floorplan for the chip can be constructed and analyzed for timing and top-level routing. During physical implementation, circuit elements can be positioned in the layout and can be electrically connected.

During analysis and extraction, the IC design's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped out" to produce masks which are used during fabrication.

As mentioned above, repeater planning can be very challenging when a group of high-speed interconnects (buses) have the same timing constraints. The timing constraints can be viewed as distance/location constraints and equal routing length constraints for purposes of repeater insertion. In existing approaches, repeaters can be moved far away from their targeted locations after legalization. Specifically, repeaters that are inserted on different nets belonging to the same bus often must be placed with same distance or location constraints. This typically leads to overlapping repeaters (one repeater per bit of the bus) being inserted in substantially the same area/location. A common solution that is used in existing approaches is to use a detailed placement engine (in particular, the cell legalization step during placement) to remove the overlap among the repeaters. In this solution, when there are many repeaters clumped together, a repeater may be moved far away from the target location, which can violate the desired distance or location constraints.

Additionally, routing detours can lead to distance differences among repeaters that are located in the same area. Specifically, when repeaters are located within a small area after legalization (i.e., assuming that the repeater movements are small so that the repeaters are not moved far from each other), the router may still need to detour a lot of routes to ensure that the routing is clean, i.e., it is free of any design rule violations. In particular, to obtain short routes to a pin, the router usually needs more space to go around pins of the repeaters. In other words, it is not sufficient to merely have legal cell placement with abutting repeaters; more space between adjacent repeater cells is typically needed to ensure clean routing. One solution is to use a predefined repeater pattern or a repeater bank with fixed spacing between adjacent cells. This solution can work reasonably well for nets in a bus that have regular width and spacing. However, for nets without regular width and spacing, this existing approach that uses predefined repeater patterns does not provide a satisfactory solution.

Additionally, repeater insertion is also challenging due to complicated bus route interactions among multiple buses. In particular, when multiple buses are routed together by either interleaving the routes or using different layers, repeaters for different buses could be routed in the same area. This can create additional challenges for repeater planning. In some cases, this problem can be solved by using custom repeater banks (array of repeaters with special connection pattern); however, it may be difficult, if not impossible, to create a solution that works across different IC designs.

Some embodiments described herein present an approach for self-organized snapping with cell snapping patterns that addresses the disadvantages in existing approaches for repeater planning. In some embodiments, regions of snapping grids are defined such that repeaters can only be placed in the predefined snapping grid units. The size of a snapping grid unit can be computed based on route touch regions of repeaters. A route touch region of a repeater is a region that forms the basic snapping grid unit. If a route touches the route touch region, the repeater on that route will be assigned to that row or column of the snapping grid. In general, the route touch region is the same size as the repeater cell. For routes that have special routing needs, the route touch region can be smaller than the repeater cells. To make sure that the final repeater location meets the cell placement rules, the snapping grid can be aligned with the placement sites.

When a repeater location is identified on a route, embodiments described herein can determine the closest available grid location along the route, and move (i.e., snap) the repeater to the grid location. Due to the grid snapping, the repeater is always placed on the route in a manner that satisfies distance and location constraints. In this manner, embodiments described herein can address the "displacement from the route" problem that existing techniques suffer from when they use a detail cell placer to legally place the repeaters.

When a new repeater is added for another net in the same or different bus, only non-occupied and non-blocked grid locations are used for placing the new repeater. In this way, all repeaters can be naturally self-snapped into no-overlapping locations on the snapping grid.

Since the location of the repeater is determined one at a time, repeaters inserted for interleaving bus and overlapping buses are automatically inserted at legal and clean routing locations. Moreover, for nets with irregular width and spacing within buses, the repeaters are snapped into the grid based on the routes of the nets (thereby automatically taking into account the uneven spacing between the nets), thereby eliminating the problems caused in existing techniques by irregular width and spacing in buses.

When adding repeaters, the IC designer often knows how much space is needed to ensure routing with no detours. Some embodiments allow an IC designer to specify the spacing needed between adjacent repeaters. The grid size can also be computed based on this information. In other words, repeaters may not be allowed to be placed into certain grid locations (also known as blocked grid locations). When blocked grid regions are present, the router can use the area of the blocked grid regions to perform clean (i.e., violation free) and efficient (i.e., no unnecessary detours) routing.

FIG. 1 illustrates a bus in accordance with some embodiments described herein. IC design 100 can include circuit blocks 102 and 104 that are interconnected by bus 106, which can comprise multiple nets 108, wherein each net interconnects a terminal on circuit block 102 with a terminal on circuit block 104. An initial routing can be performed on bus 106 as shown in FIG. 1, and this can be the starting point for some embodiments described herein. The embodiments described herein can insert and place repeaters on the nets of bus 106, and then the rest of the nets in IC design 100 can be routed by using a router.

Specifically, given a design with interconnect buses routed (e.g., IC design 100 in FIG. 1), embodiments described herein can add a group of repeaters to the routed interconnect buses. Some embodiments can trace the routes of the nets in the buses and determine where repeaters are to be added. After an initial location of a new repeater is identified, a self-organized snapping technique is used to determine the actual repeater location. Some embodiments use the following sequence of steps to perform repeater insertion. (1) Create snapping patterns. A snapping pattern describes feasible grid regions (can place repeaters) and blocked grid regions (cannot place repeater). (2) Define snapping regions. A snapping region defines where repeaters can be placed and snapped in the snapping pattern. (3) Snap repeaters. Specifically, this step inserts repeaters on-route and snaps the repeaters to the closest feasible grid region.

Figure 2A:
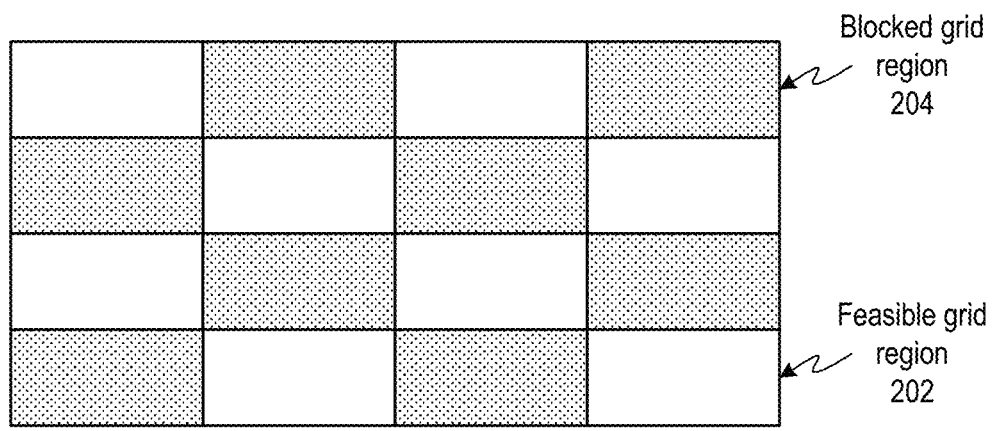
FIGS. 2A-2B illustrate snapping patterns in accordance with some embodiments described herein.
Figure 2B:
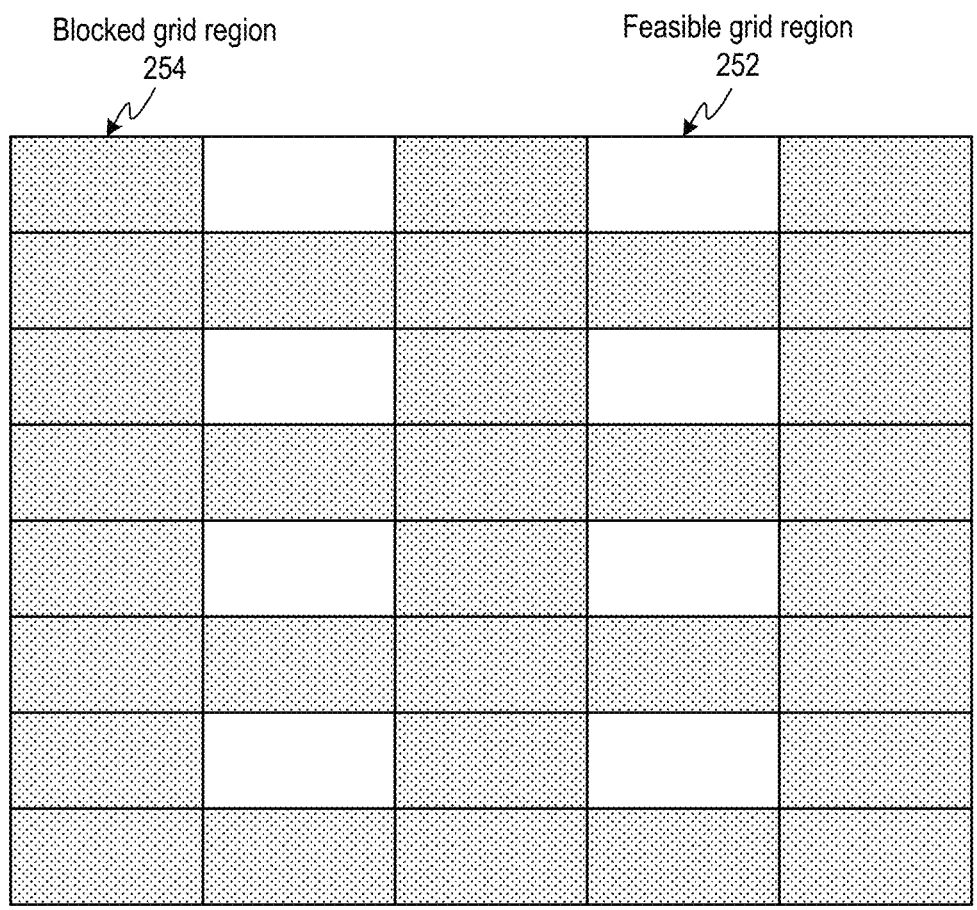

FIG. 2A-2B illustrate snapping patterns in accordance with some embodiments described herein. A snapping pattern can be created based on a predefined pattern and user-specified repeater library cells. FIG. 2A illustrates a checkerboard snapping pattern, and FIG. 2B illustrates an array snapping pattern. As shown in FIG. 2A, the checkerboard snapping pattern arranges the repeaters like a checkerboard. Specifically, the checkerboard snapping pattern includes blocked grid regions (e.g., blocked grid region 204) and feasible gird regions (e.g., feasible grid region 202) that are arranged in a checkerboard pattern. During repeater insertion, the repeaters are allowed to be placed in any of the feasible grid regions, but are not allowed to be placed in any of the blocked grid regions.

FIG. 2B illustrates an array snapping pattern in which feasible grid regions (e.g., feasible grid region 252) are arranged in an array pattern. As shown in FIG. 2B, feasible grid regions are separated by blocked grid regions (e.g., blocked grid region 254). The blocked grid regions can be used by the router to create violation-free routes. The horizontal and vertical spacing between the feasible grid regions can be determined by using one or more of: (1) the repeater cell size, (2) desired spacing between adjacent repeaters, and (3) any additional adjustments desired by a user.

Figure 3:
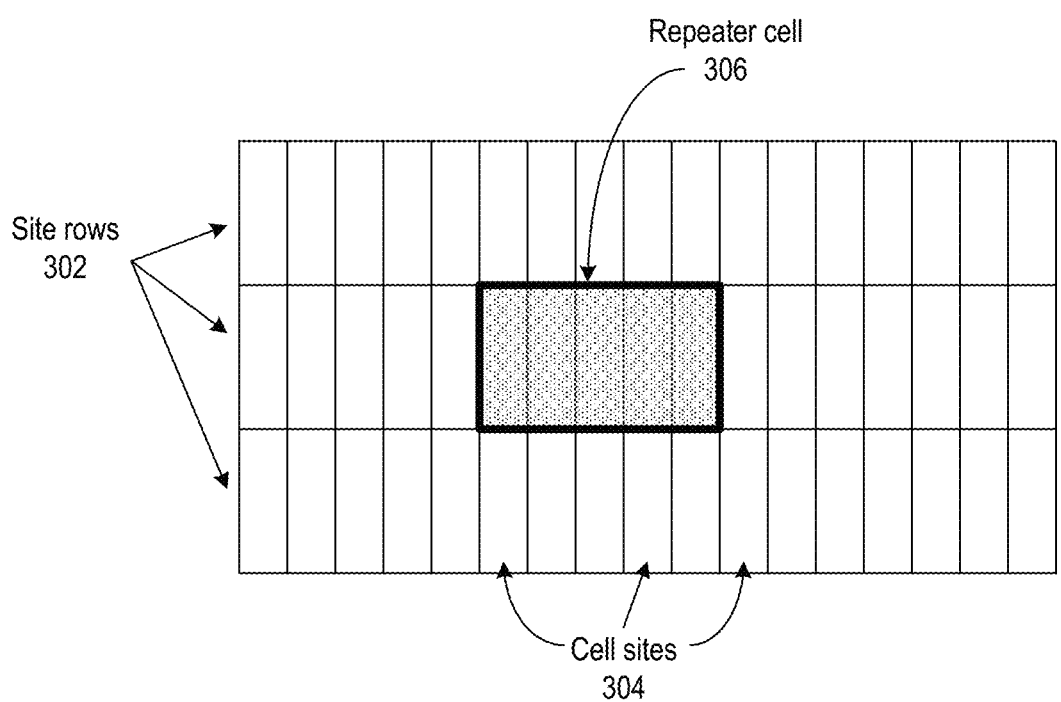
FIG. 3 illustrates snapping regions in accordance with some embodiments described herein.

FIG. 3 illustrates snapping regions in accordance with some embodiments described herein. In an IC design, a cell site (e.g., cell sites 304) is the smallest placement area for placing a cell. Cell sites can be arranged in rows, e.g., site rows 302, and each cell site can have a predefined width. In some embodiments, the height of a repeater cell (e.g., repeater cell 306) can be equal to the height of a cell site, and the width of the repeater cell can be an integral multiple of the width of a cell site. In other embodiments, the height of a repeater cell can be an integral multiple of the height of a cell site. For legal repeater placement, boundaries of a repeater cell must be aligned to the boundaries of cell sites, and the repeater cell must be placed in an allowable orientation.

A snapping region can be an area where one or more snapping patterns are used to place repeaters. The snapping grid in a snapping region is derived based on the snapping pattern. The size of a snapping grid is at least the size of a repeater cell, which ensures that adjacent repeaters do not overlap. Each snapping grid is marked as either a feasible grid region or blocked grid region. A repeater is placed only on feasible grid regions. The term "snapping" refers to the operation of placing a repeater only on the feasible grid regions.

A snapping grid can be used to place different repeaters having the same width by using the same snapping pattern. If repeaters with different widths are needed in the IC design, then multiple snapping grids can be created for the same placement area using the same or different patterns. In such scenarios, a repeater placed in one snapping grid can cause one or more feasible grid regions in the other snapping grids to become blocked.

Figure 4A:
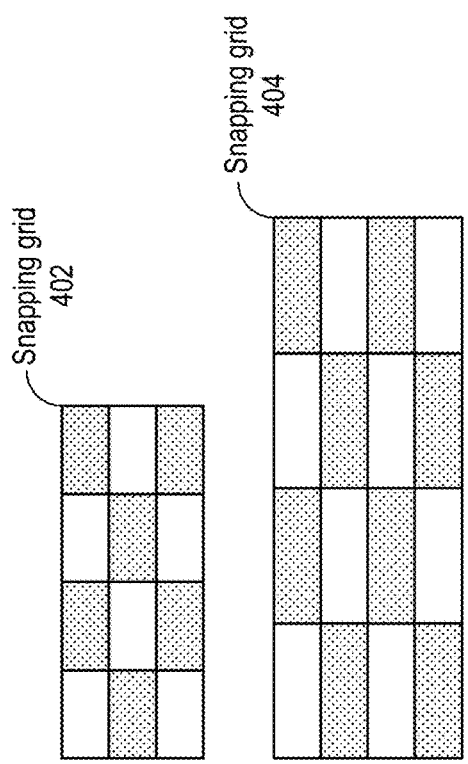
FIGS. 4A-4C illustrate how multiple snapping grids can be used to place repeater cells in accordance with some embodiments described herein.
Figure 4B:
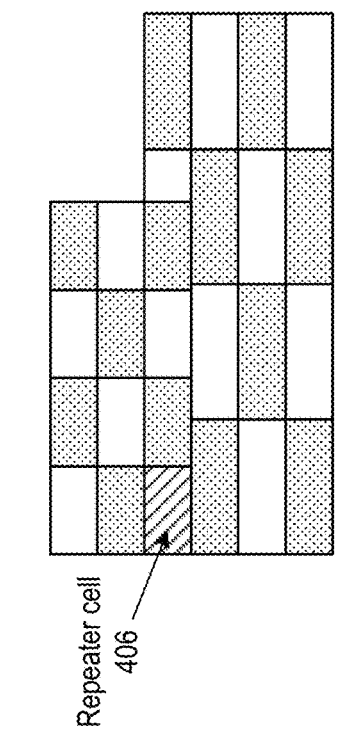
Figure 4C:
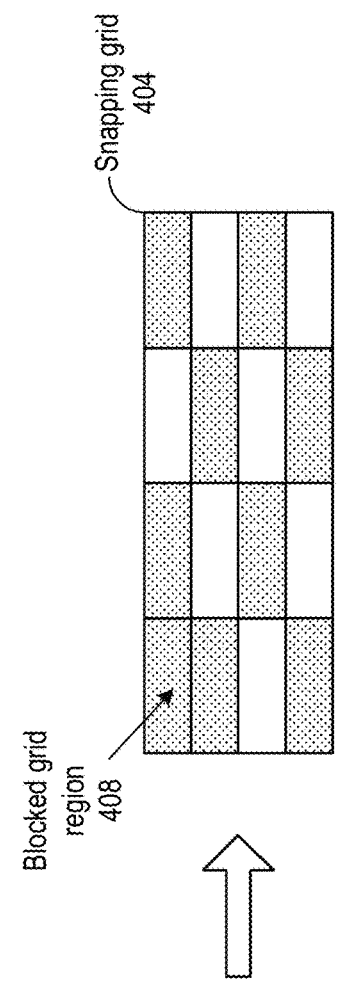

FIGS. 4A-4C illustrate how multiple snapping grids can be used to place repeater cells in accordance with some embodiments described herein. As shown in FIG. 4A, the width of the grid regions of snapping grid 402 is less than the width of the grid regions of snapping grid 404. As shown in FIG. 4B, suppose the bottom row of snapping grid 402 overlaps with the top row of snapping grid 404, and repeater cell 406 is placed in the bottom left corner of snapping grid 402. Some embodiments can change the status of the top left corner of snapping grid 404 from a feasible grid region to a blocked grid region 408 as shown in FIG. 4C. Changing the status of the grid regions of snapping grid 404 ensures that repeaters that are placed using snapping grid 404 do not overlap with repeater cell 406, which was placed using snapping grid 402.

Some embodiments define the snapping region to be the area covering all the placement sites in a design. In some embodiments, the snapping region can be defined to be an area that covers a channel. To avoid overlap between macros and repeaters, some embodiments make sure that the snapping region does not overlap with any macros.

Figure 5A:
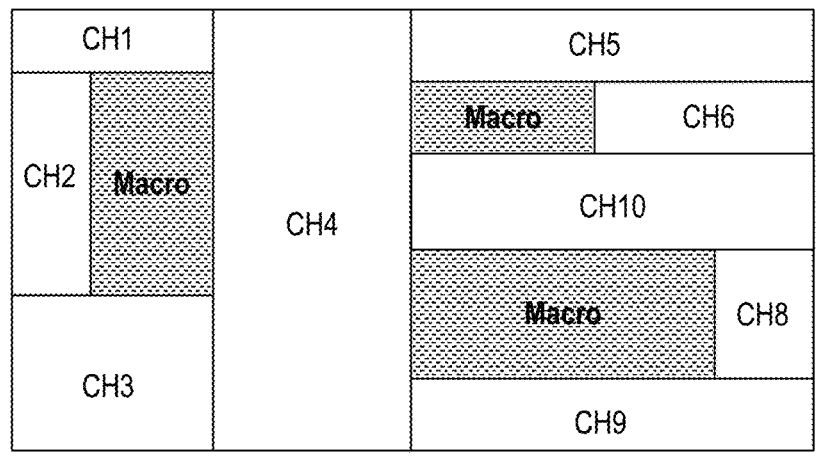
FIGS. 5A-5B illustrate how snapping regions can be defined in accordance with some embodiments described herein.
Figure 5B:
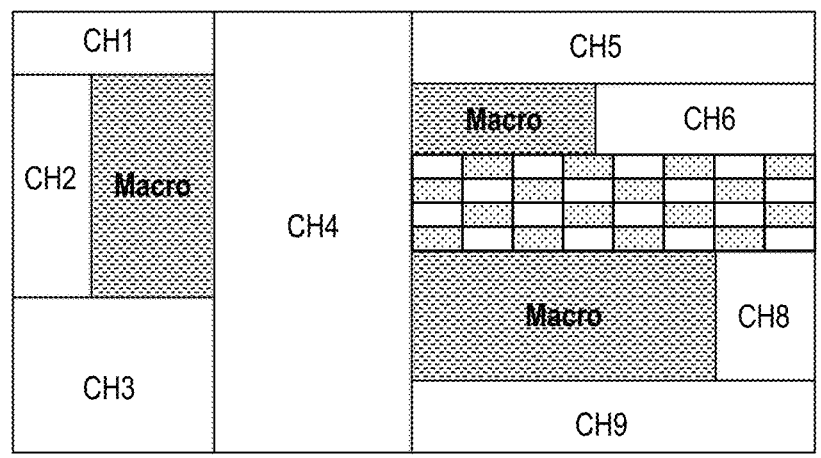

FIGS. 5A-5B illustrate how snapping regions can be defined in accordance with some embodiments described herein. FIG. 5A illustrates an area of an IC design layout that includes three macros, and ten channels CH1 through CH10. In FIG. 5B, a snapping region has been placed in channel CH10.

Figure 6A:
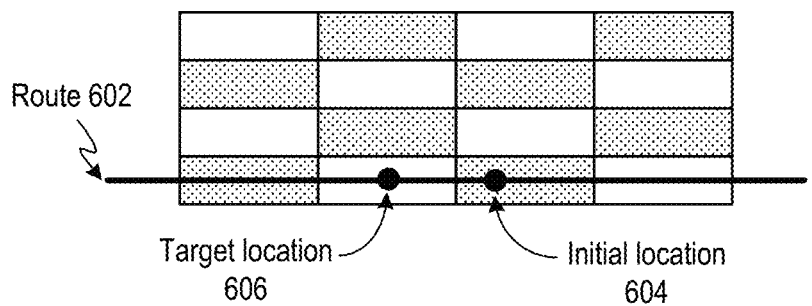
FIGS. 6A-6C illustrate how repeaters can be snapped during on-route repeater insertion in accordance with some embodiments described herein.
Figure 6B:
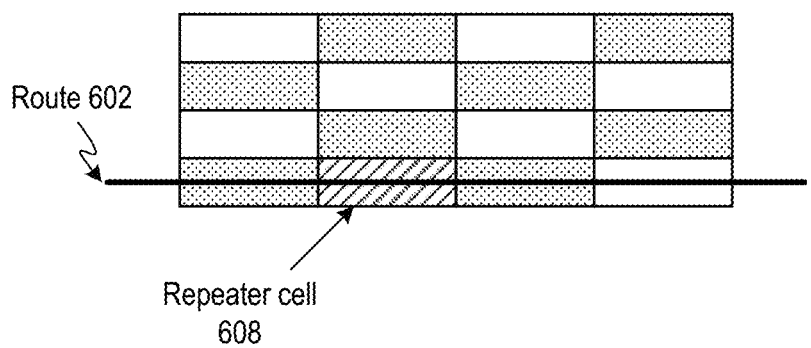
Figure 6C:
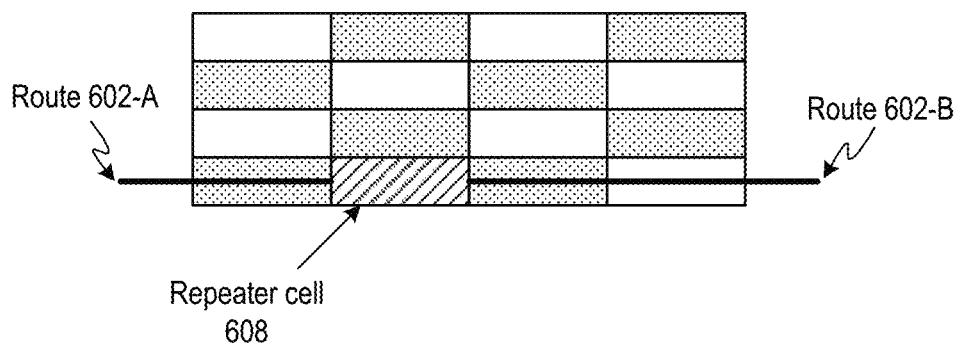

FIGS. 6A-6C illustrate how repeaters can be snapped during on-route repeater insertion in accordance with some embodiments described herein. In FIG. 6A, route 602 (which corresponds to a net of an interconnect bus) passes through the bottom row of a checkerboard snapping grid. To insert a repeater in a net, the embodiment can trace route 602, and identify an initial repeater location 604. Next, the embodiment can determine the closest unoccupied feasible grid region on route 602 (shown by target location 606). Once the unoccupied feasible grid is identified, repeater cell 608 can be inserted in the net, and snapped to the feasible grid as shown in FIG. 6B. Note that the closest unoccupied feasible grid region on route 602 must be on route 602, i.e., route 602 should pass through the feasible grid region. In other words, a feasible grid region that is not on route 602 will not be used to place the repeater cell.

Additionally, route 602 can be split into two sections, namely, routes 602-A and 602-B, as shown in FIG. 6C. Route 602-A can be assigned to the input net of repeater cell 608, and route 602-B can be assigned to the output net of repeater cell 608. Note that, if a feasible grid region is occupied by a repeater cell (e.g., repeater cell 608), the occupied feasible grid region is henceforth treated as blocked grid region. Therefore, when the next repeater cell is inserted, the embodiment determines the next closest unoccupied feasible grid for the repeater cell.

Figure 7:
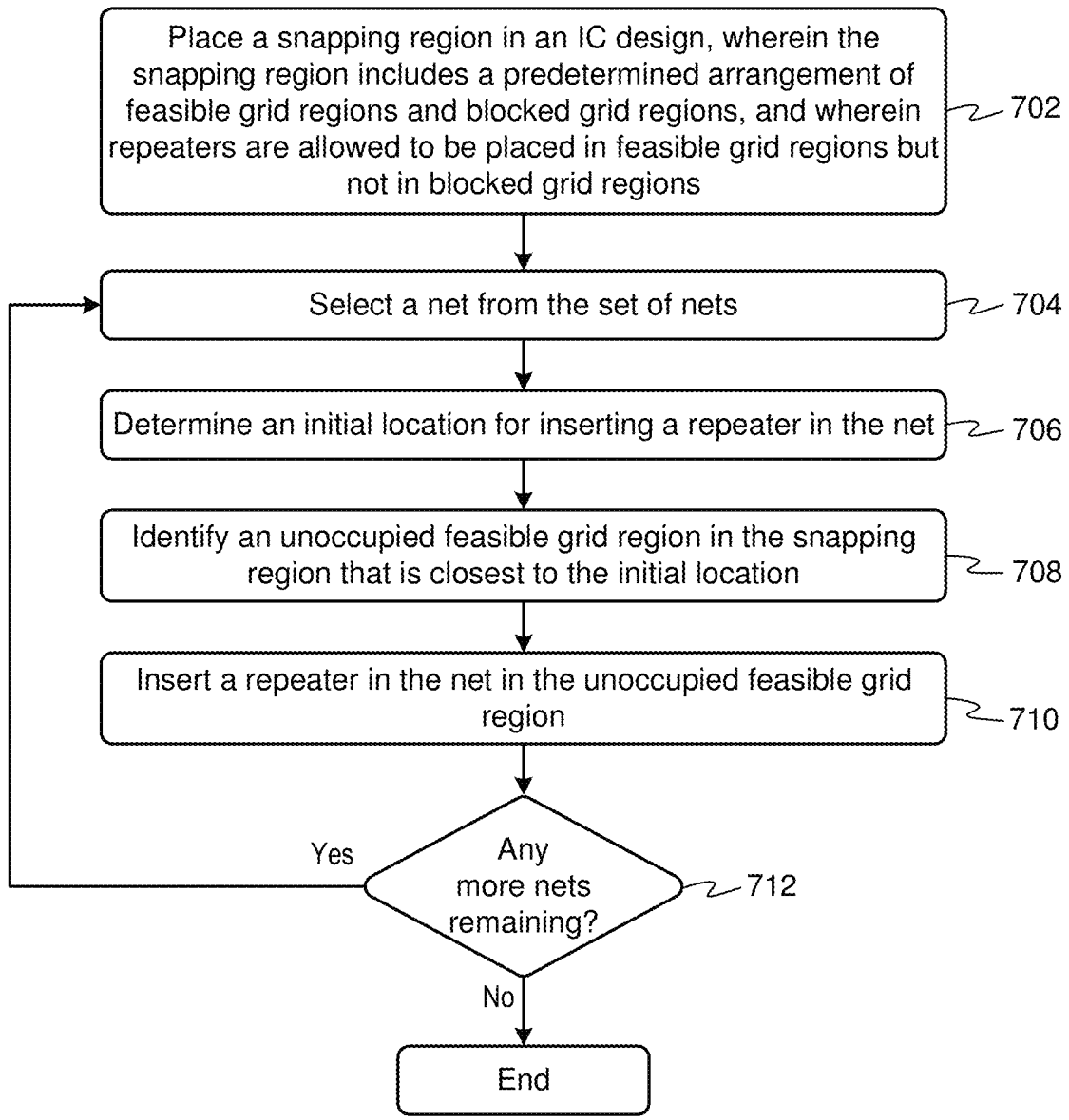
FIG. 7 illustrates a process for inserting repeaters in accordance with some embodiments described herein.

FIG. 7 illustrates a process for inserting repeaters in accordance with some embodiments described herein. The process can begin by placing a snapping region in an IC design, wherein the snapping region includes a predetermined arrangement of feasible grid regions and blocked grid regions, and wherein repeaters are allowed to be placed in feasible grid regions but not in blocked grid regions (step 702). In some embodiments, the set of nets can represent a bus interconnect in the IC design, e.g., nets 108 represent bus 106 in FIG. 1. In some embodiments, the snapping region is placed where the bus interconnect is routed, e.g., the snapping region can be placed in IC design 100 in FIG. 1 where bus 106 is routed. In some embodiments, the snapping region is placed in a channel that does not overlap with macros in the IC design as shown in FIGS. 5A-5B.

Next, the process can select a net from the set of nets (step 704). The process can then determine an initial location for inserting a repeater in the net (step 706). Techniques for determining a location for inserting a repeater (i.e., a buffer or a pair of inverters) in a net are well known in the art. For example, see J. Cong, L. He, C.-K. Koh, and P. H. Madden, "Performance optimization of VLSI interconnect layout," Integration: the VLSI Journal, 21:1-94, 1996.

Next, the process can identify an unoccupied feasible grid region in the snapping region that is closest to the initial location (step 708). Specifically, in some embodiment, the process identifies an unoccupied feasible grid region that is on the route of the net (i.e., the net's route passes through the unoccupied feasible grid region) and is closest to the initial location. The process can then insert a repeater in the net in the unoccupied feasible grid region (step 710). Note that the unoccupied feasible grid region can be treated as a blocked grid region in subsequent iterations so that repeaters of different nets are automatically and always placed legally.

In some embodiments, the process can place a second snapping region that at least partially overlaps with the first snapping region that was placed in step 702, and wherein all feasible grid regions in the second snapping region that overlap with the unoccupied feasible grid region in the first snapping region are treated as blocked grid regions in subsequent iterations. For example, in FIGS. 4A-4C, snapping grid 402 can be the first snapping region, snapping grid 404 can be the second snapping region. Note that the top left feasible grid region in snapping grid 404 has been marked as a blocked grid region 408 (see FIG. 4C) because of the repeater cell that was placed in the bottom left feasible grid of snapping grid 402 (see FIG. 4B).

In some embodiments, the net can be split into a first net and a second net, wherein the first net is electrically connected to an input of the repeater, and wherein the second net is electrically connected to an output of the repeater. For example, in FIGS. 6A-6C, the route 602 for a net is split into two routes for two nets, wherein route 602-A can correspond to an input net that is electrically connected to an input of the repeater cell 608, and route 602-B can correspond to an output net that is electrically connected to an output of the repeater cell 608.

Next, the process can check if any more nets are remaining that need to be processed (step 712). If so, the process can return to step 704, and if not, the process can end.

Figure 8:
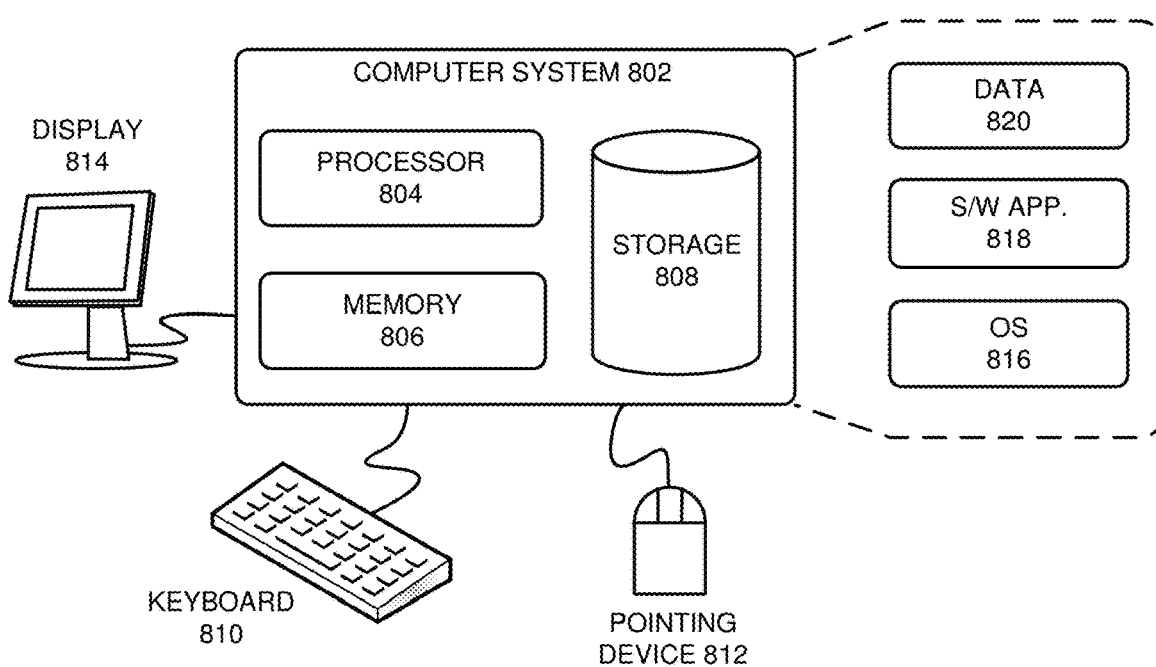
FIG. 8 illustrates a computer system in accordance with some embodiments described herein.

FIG. 8 illustrates a computer system in accordance with some embodiments described herein. The term "computer" or "computer system" generally refers to a hardware-based system that can perform computations required for the design and manufacture of ICs. Computer system 802 can include processor 804, memory 806, and storage device 808. Computer system 802 may include multiple processors, and processor 804 may include multiple cores. Specifically, memory locations in memory 806 can be addressable by processor 804, thereby enabling processor 804 to access (e.g., via load/store instructions) and manipulate (e.g., via logical/floating point/arithmetic instructions) the data stored in memory 806. Computer system 802 can be coupled to display device 814, keyboard 810, and pointing device 812. Storage device 808 can store operating system 816, software application 818, and data 820. Data 820 can include input required by software application 818 and/or output generated by software application 818.

Computer system 802 may automatically (or with user help) perform one or more operations that are implicitly or explicitly described in this disclosure. Specifically, computer system 802 can load software application 818 into memory 806, and software application 818 can then be used to insert repeaters using the above-mentioned processes. The resulting IC design is expected to have better performance and/or quality of results (QoR) because repeaters were placed by using the processes described in this disclosure.

Figure 9A:
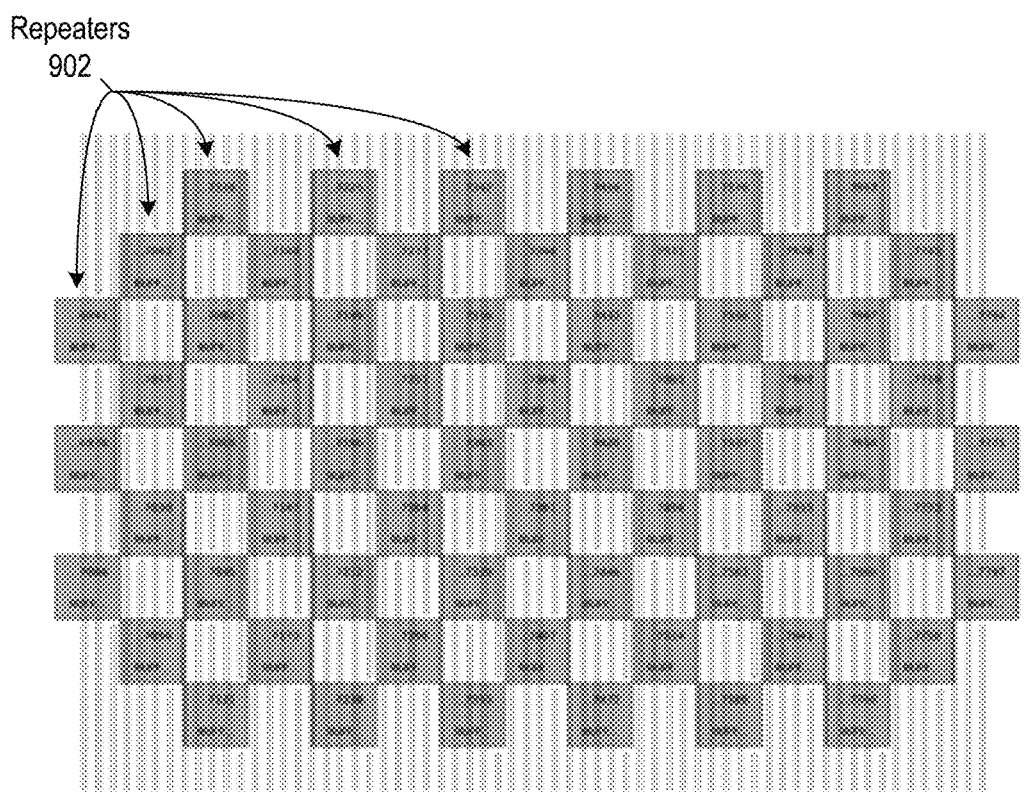
FIGS. 9A-9C illustrate interconnects with inserted repeaters in accordance with some embodiments described herein.
Figure 9B:
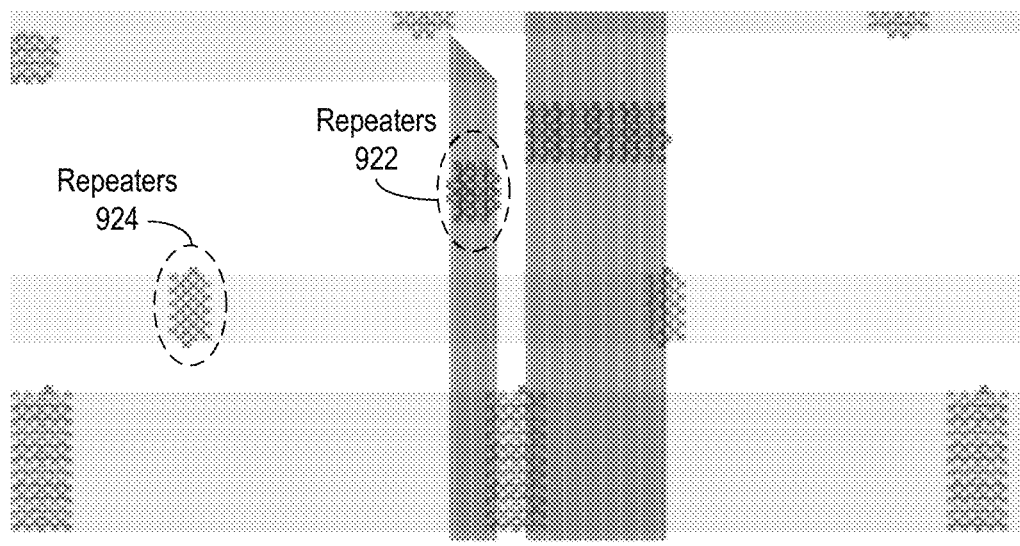
Figure 9C:
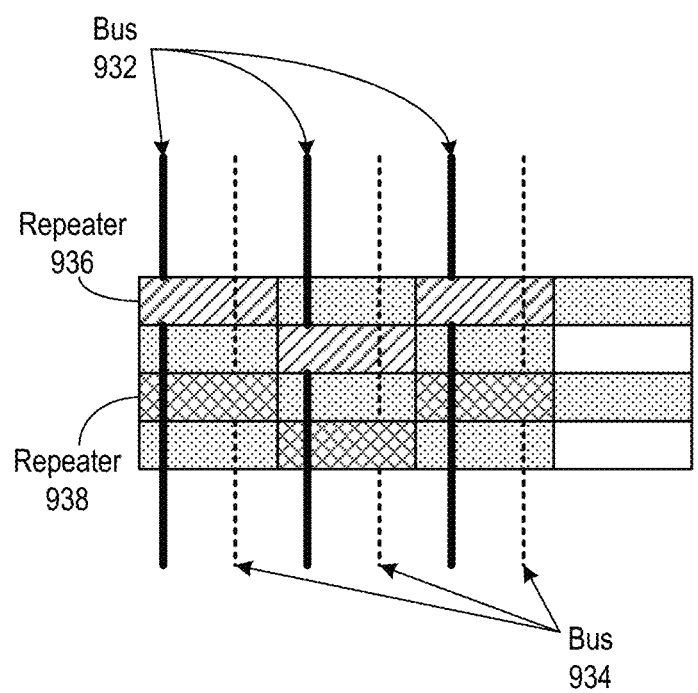

FIGS. 9A-9C illustrate interconnects with inserted repeaters in accordance with some embodiments described herein. FIG. 9A shows a group of repeaters that belong to the same bus. Note that the repeaters, e.g., repeaters 902, have been inserted in proximity to each other. As can be seen in FIG. 9A, repeaters on each bit (net) of the bus do not overlap with adjacent repeaters, and also have sufficient routing area for routing violation free routing.

FIG. 9B illustrates a situation that includes different buses with overlapping routes. Repeaters 922 have been placed on the vertical portion of a first bus that overlaps with the horizontal portion of a second bus, on which repeaters 924 have been placed. As shown in FIG. 9B, the repeaters are automatically self-organized into the predefined snapping patterns. Likewise, repeater groups are automatically self-organized into for busses that have uneven spacing between nets. Because of the predefined snapping patterns, repeater cells are inserted at proper locations even when the spacing between nets is uneven.

FIG. 9C illustrates a situation where two buses are interleaved. Specifically, bus 932 includes three nets shown with bold lines, and bus 934 includes three nets shown with dashed lines. Repeater 936 is inserted on one of the nets of bus 932, and repeater 938 is inserted on one of the nets of bus 934. As mentioned before, when a new repeater is inserted, the process is aware of the repeaters that have previously been inserted, and the snapping pattern automatically ensures that there are sufficient routing resources to perform routing violation free routing.

While 'data' and 'information' often are used interchangeably (e.g., 'data processing' and 'information processing'), the term 'datum' (plural 'data') typically signifies a representation of the value of a measurement of a physical quantity (e.g., the current in a wire), or the answer to a question (e.g., "yes" or "no"), while the term 'information' typically signifies a structured set of data (often times signified by 'data structure'). A specified data structure is used to structure an electronic device to be used as a specific machine as an article of manufacture (see In re Lowry, 32 F.3d 1579 [CAFC, 1994]). Data and information are physical, for example binary data (a 'bit', usually signified with '0' and '1') enabled with two different levels of voltage in a circuit. For example, data can be enabled as an electrical, magnetic, optical or acoustical signal; a quantum state such as spin that enables a 'qubit'; or a physical state of an atom or molecule. All such data and information, when enabled, are stored, accessed, transferred, combined, compared, or otherwise acted upon, actions that require energy.

As used herein, the term 'process' signifies an unnatural sequence of physical actions and/or transformations (both also referred to as 'operations' or 'steps') to produce at least one result. The actions and transformations are technical applications of one or more natural laws of science or unnatural laws of technology. The actions and transformations often change the physical state of a machine, of structures of data and information, or of a composition of matter. Two or more actions can occur at about the same time, or one action can occur before or after another action, if they produce the same result. A description of the physical actions and/or transformations that comprise a process are often signified with a set of gerund phrases (or their semantic equivalents) that are typically preceded with the signifier 'the steps of' (e.g., "a process comprising the steps of measuring, transforming, partitioning and then distributing . . . "). The signifiers 'algorithm', 'method', 'procedure', '(sub)routine', 'protocol', 'recipe', and 'technique' often are used interchangeably with 'process', and 35 U.S.C. 100 defines a "method" as one type of process that is, by statutory law, always patentable under 35 U.S.C. 101. Many forms of knowledge, learning, skills and styles are authored, structured, and enabled—objectively—as processes—e.g., knowledge and learning as functions in knowledge programming languages. As used herein, the term 'rule' signifies a process with at least one conditional test (signified, e.g., by 'IF test THEN process'). As used herein, the term 'thread' signifies a sequence of operations or instructions that comprise a subset of an entire process. A process can be partitioned into multiple threads that can be used at or about at the same time.

As used herein, the term 'component' (also signified by 'part', and typically signified by 'element' when described in a patent text or diagram) signifies a physical object that is used to enable a process in combination with other components. For example, electronic components are used in processes that affect the physical state of one or more ('ensemble') electromagnetic or quantum particles/waves (e.g., electrons, photons) or quasiparticles (e.g., electron holes, phonons, magnetic domains) and their associated fields or signals. Electronic components have at least two connection points to which are attached 'leads', typically a wire with one end attached to the component and the other end attached to another component, typically as part of a circuit with current flows. There are at least three types of electrical components: passive, active and electromechanical. Passive electronic components typically do not introduce energy into a circuit—such components include resistors, memristors, capacitors, magnetic inductors, crystals, Josephson junctions, transducers, sensors, antennas, waveguides, etc. Active electronic components require a source of energy and can inject energy into a circuit—such components include semiconductors (e.g., diodes, transistors, optoelectronic devices), vacuum tubes, batteries, power supplies, displays (e.g., LEDs, LCDs, lamps, CRTs, plasma displays). Electromechanical components affect current flow using mechanical forces and structures—such components include switches, relays, protection devices (e.g., fuses, circuit breakers), heat sinks, fans, cables, wires, terminals, connectors and printed circuit boards. As used herein, the term 'netlist' is a specification of the components comprising an electric circuit, and electrical connections between the components. The programming language for the SPICE circuit simulation program is often used to specify a netlist. In the context of circuit design, the term 'instance' signifies each time a component is specified in a netlist.

One of the most important components as goods in commerce is the integrated circuit, and its res of abstractions. As used herein, the term 'integrated circuit' signifies a set of connected electronic components on a small substrate (thus the use of the signifier 'chip') of semiconductor material, such as silicon or gallium arsenide, with components fabricated on one or more layers. Other signifiers for 'integrated circuit' include 'monolithic integrated circuit', 'IC', 'chip', 'microchip' and 'System on Chip' ('SoC'). Types of integrated circuits include gate/logic arrays, processors, memories, interface chips, power controllers, and operational amplifiers. The term 'cell' as used in electronic circuit design signifies a specification of one or more components, for example, a set of transistors that are connected to function as a logic gate. Cells are usually stored in a database, to be accessed by circuit designers and design processes.

As used herein, the term 'module' signifies a tangible structure for acting on data and information that typically is limited in size and/or complexity. For example, the term 'module' can signify one or more processes that transforms data and information, for example, processes comprising a computer program. The term 'module' also can signify one or more interconnected electronic components, such as digital logic devices. A process comprising a module, if specified in a programming language, such as System C or Verilog, also can be transformed into a specification for a structure of electronic components that transform data and information that produce the same result as the process. This last sentence follows from a modified Church-Turing thesis, which is simply expressed as "Whatever can be transformed by a (patentable) process and a processor, can be transformed by a (patentable) equivalent set of modules.", as opposed to the doublethink of deleting only one of the "(patentable)".

A module is permanently structured (e.g., circuits with unalterable connections), temporarily structured (e.g., circuits or processes that are alterable with sets of data), or a combination of the two forms of structuring. Permanently structured modules can be manufactured, for example, using Application Specific Integrated Circuits ('ASICs') such as Arithmetic Logic Units ('ALUs'), Programmable Logic Arrays ('PLAs'), or Read Only Memories ('ROMs'), all of which are typically structured during manufacturing. For example, a permanently structured module can comprise an integrated circuit. Temporarily structured modules can be manufactured, for example, using Field Programmable Gate Arrays (FPGAs—for example, sold by Xilink or Intel's Altera), Random Access Memories (RAMs) or microprocessors. For example, data and information is transformed using data as an address in RAM or ROM memory that stores output data and information. One can embed temporarily structured modules in permanently structured modules (for example, a FPGA embedded into an ASIC).

Modules that are temporarily structured can be structured during multiple time periods. For example, a processor comprising one or more modules has its modules first structured by a manufacturer at a factory and then further structured by a user when used in commerce. The processor can comprise a set of one or more modules during a first time period, and then comprise a different set of one or modules during a second time period. The decision to manufacture or implement a module in a permanently structured form, in a temporarily structured form, or in a combination of the two forms, depends on issues of commerce such as cost, time considerations, resource constraints, tariffs, maintenance needs, national intellectual property laws, and/or specific design goals. How a module is used is mostly independent of the physical form in which it is manufactured or enabled. This last sentence also follows from the modified Church-Turing thesis.

As used herein, the term 'processor' signifies a tangible data and information processing machine for use in commerce that physically transforms, transfers, and/or transmits data and information, using at least one process. A processor consists of one or more modules (e.g., a central processing unit, 'CPU'; an input/output ('I/O') controller, a memory controller, a network controller, and other modules). The term 'processor' can signify one or more processors, or one or more processors with multiple computational cores/CPUs, specialized processors (for example, graphics processors or signal processors), and their combinations. Where two or more processors interact, one or more of the processors can be remotely located. Where the term 'processor' is used in another context, such as a 'chemical processor', it will be signified and defined in that context.

The processor can comprise, for example, digital logic circuitry (for example, a binary logic gate), and/or analog circuitry (for example, an operational amplifier). The processor also can use optical signal processing, DNA transformations or quantum operations, microfluidic logic processing, or a combination of technologies, such as an optoelectronic processor. For data and information structured with binary data, any processor that can transform data and information using the AND, OR and NOT logical operations (and their derivatives, such as the NAND, NOR, and XOR operations) also can transform data and information using any function of Boolean logic. A processor such as an analog processor, such as an artificial neural network, also can transform data and information. No scientific evidence exists that any of these technological processors are processing, storing and retrieving data and information, using any process or structure equivalent to the bioelectric structures and processes of the human brain.

The one or more processors also can use a process in a 'cloud computing' environment, where time and resources of multiple remote computers are shared by multiple users or processors communicating with the computers. For example, a group of processors can use at least one process available at a distributed or remote system, these processors using a communications network (e.g., the Internet, or an Ethernet) and using one or more specified interfaces (e.g., an application program interface ('APP') that signifies functions and data structures to communicate with the remote process).

As used herein, the term 'computer' and 'computer system' (further defined below) includes at least one processor that, for example, performs operations on data and information such as (but not limited to) the AND, OR and NOT logical operations using electronic gates that can comprise transistors, with the addition of memory (for example, memory structured with flip-flops using the NOT-AND or NOT-OR operation). Such a processor is Turing-complete and computationally universal. A computer can comprise a simple structure, for example, comprising an I/O module, a CPU, and a memory that performs, for example, the process of inputting a signal, transforming the signal, and outputting the signal with no human intervention.

As used herein, the term 'programming language' signifies a structured grammar for specifying sets of operations and data for use by modules, processors and computers. Programming languages include assembler instructions, instruction-set-architecture instructions, machine instructions, machine dependent instructions, microcode, firmware instructions, state-setting data, or either source code or object code written in any combination of one or more higher level languages, for example, the C programming language and similar general programming languages (such as Fortran, Basic, Javascript, PHP, Python, C++), knowledge programming languages (such as Lisp, Smalltalk, Prolog, or CycL), electronic structure programming languages (such as VHDL, Verilog, SPICE or SystemC), text programming languages (such as SGML, HTML, or XML), or audiovisual programming languages (such as SVG, MathML, X3D/VRML, or MIDI), and any future equivalent programming languages. As used herein, the term 'source code' signifies a set of instructions and data specified in text form using a programming language. A large amount of source code for use in enabling any of the claimed inventions is available on the Internet, such as from a source code library such as Github.

As used herein, the term 'program' (also referred to as an 'application program') signifies one or more processes and data structures that structure a module, processor or computer to be used as a "specific machine" (see In re Alappat, 33 F3d 1526 [CAFC, 1991]). One use of a program is to structure one or more computers, for example, standalone, client or server computers, or one or more modules, or systems of one or more such computers or modules. As used herein, the term 'computer application' signifies a program that enables a specific use, for example, to enable text processing operations, or to encrypt a set of data. As used herein, the term 'firmware' signifies a type of program that typically structures a processor or a computer, where the firmware is smaller in size than a typical application program, and is typically not very accessible to or modifiable by the user of a computer. Computer programs and firmware are often specified using source code written in a programming language, such as C. Modules, circuits, processors, programs, and computers can be specified at multiple levels of abstraction, for example, using the SystemC programming language, and have value as products in commerce as taxable goods under the Uniform Commercial Code (see U.C.C. Article 2, Part 1).

A program is transferred into one or more memories of the computer or computer system from a data and information device or storage system. A computer system typically has a device for reading storage media that is used to transfer the program, and/or has an interface device that receives the program over a network. This process is discussed in the General Computer Explanation section.

The signifier 'commercial solution' signifies, solely for the following paragraph, an engineering domain-specific (and thus non-preemptive—see Bilski): electronic structure, a process for a specified machine, a manufacturable circuit (and their Church-Turing equivalents) or a composition of matter that applies science and/or technology in commerce to solve a technical problem.

The signifier 'abstract' (when used in a patent claim for any enabled embodiments disclosed herein for a new commercial solution that is a scientific use of one or more laws of nature {see Benson}, and that solves a problem of technology {see Diehr} used in commerce—or improves upon an existing commercial solution {see Diehr})—is precisely defined by the inventor(s) {see MPEP 2111.01 (9th edition, Rev. 08.2017)} as follows:

a) a new commercial solution is 'abstract' if it is not novel (e.g., it is so well known in equal prior art {see Alice} and/or the use of equivalent prior art solutions is long prevalent {see Bilski} in science, engineering or commerce), and thus unpatentable under 35 U.S.C. 102, for example, because it is 'difficult to understand' {see Merriam-Webster definition for 'abstract'} how the commercial solution differs from equivalent prior art solutions; or b) a new commercial solution is 'abstract' if it is obvious, that is, if the existing prior art includes at least one analogous prior art solution {see KSR}, or the existing prior art includes at least two prior art publications that can be combined {see Alice} by a skilled person {often referred to as a 'PHOSITA', see MPEP 2141-2144 (9th edition, Rev. 08.2017)} to be equivalent to the new commercial solution, and is thus unpatentable under 35 U.S.C. 103, for example, because it is 'difficult to understand' how the new commercial solution differs from a PHOSITA-combination/-application of the existing prior art; or c) a new commercial solution is 'abstract' if it is not disclosed with a description that enables its praxis, either because insufficient guidance exists in the description, or because only a generic implementation is described {see Mayo} with unspecified components, parameters or functionality, so that a PHOSITA is unable to instantiate an embodiment of the new solution for use in commerce, without, for example, requiring special programming {see Katz} (or, e.g., circuit design) to be performed by the PHOSITA, and is thus unpatentable under 35 U.S.C. 112, for example, because it is 'difficult to understand' how to use in commerce any embodiment of the new commercial solution.

The Detailed Description signifies in isolation the individual features, structures, functions, or characteristics described herein and any combination of two or more such features, structures, functions or characteristics, to the extent that such features, structures, functions or characteristics or combinations thereof are enabled by the Detailed Description as a whole in light of the knowledge and understanding of a skilled person, irrespective of whether such features, structures, functions or characteristics, or combinations thereof, solve any problems disclosed herein, and without limitation to the scope of the Claims of the patent. When an embodiment of a claimed invention comprises a particular feature, structure, function or characteristic, it is within the knowledge and understanding of a skilled person to use such feature, structure, function, or characteristic in connection with other embodiments whether or not explicitly described, for example, as a substitute for another feature, structure, function or characteristic.

In view of the Detailed Description, a skilled person will understand that many variations of the claimed inventions can be enabled, such as function and structure of elements, described herein while remaining in the domain of the claimed inventions. One or more elements of an embodiment can be substituted for one or more elements in another embodiment, as will be understood by a skilled person. Writings about embodiments signify their uses in commerce, thereby enabling other skilled people to similarly use in commerce.

This Detailed Description is fitly written to provide knowledge and understanding. It is neither exhaustive nor limiting of the precise structures described, but is to be accorded the widest scope consistent with the disclosed principles and features. A skilled person can enable many equivalent variations. Without limitation, any and all equivalents described, signified or Incorporated By Reference in this patent application are specifically Incorporated By Reference into the Detailed Description. In addition, any and all variations described, signified or Incorporated By Reference with respect to any one claimed invention and its embodiment also are included with all other claimed inventions and their embodiments. Any such variations include both currently known variations as well as future variations, for example any element used for enablement includes a future equivalent element that provides the same function, regardless of the structure of the future equivalent element.

It is intended that the domain of the set of claimed inventions and their embodiments be defined and judged by the following Claims and their equivalents. The Detailed Description includes the following Claims, with each Claim standing on its own as a separate claimed invention. The embodiments of the claimed inventions can have more structure and features than are explicitly specified in the Claims.

The foregoing embodiments have been presented for purposes of illustration and description. They are not intended to be exhaustive or to limit the scope of this disclosure to the forms disclosed. Accordingly, many modifications and variations will be apparent to practitioners skilled in the art. Additionally, the above disclosure is not intended to limit the disclosed subject matter. The scope of the claimed invention(s) is defined by the appended claims.

What is claimed is:

1. A non-transitory computer-readable storage medium storing instructions that, when executed by a computer, cause the computer to perform a method for inserting repeaters in an integrated circuit (IC) design, the method comprising:
   placing a first snapping region in the IC design, wherein the first snapping region includes a predetermined arrangement of feasible grid regions and blocked grid regions, and wherein repeaters are allowed to be placed in feasible grid regions but not in blocked grid regions; and
   iteratively performing a set of operations, comprising:
   selecting a net from a set of nets;
   determining an initial location for inserting a repeater in the net;
   identifying an unoccupied feasible grid region in the first snapping region that is closest to the initial location; and
   inserting a repeater in the net in the unoccupied feasible grid region.

2. The non-transitory computer-readable storage medium of claim 1, wherein the set of nets represent a bus interconnect in the IC design.

3. The non-transitory computer-readable storage medium of claim 2, wherein the first snapping region is placed where the bus interconnect is routed.

4. The non-transitory computer-readable storage medium of claim 1, wherein the unoccupied feasible grid region is treated as a blocked grid region in subsequent iterations.

5. The non-transitory computer-readable storage medium of claim 4, wherein the method further comprises placing a second snapping region that at least partially overlaps with the first snapping region, and wherein all feasible grid regions in the second snapping region that overlap with the unoccupied feasible grid region in the first snapping region are treated as blocked grid regions in subsequent iterations.

6. The non-transitory computer-readable storage medium of claim 1, wherein the net is split into a first net and a second net, wherein the first net is electrically connected to an input of the repeater, and wherein the second net is electrically connected to an output of the repeater.

7. The non-transitory computer-readable storage medium of claim 1, wherein the first snapping region is placed in a channel that does not overlap with macros in the IC design.

8. An apparatus, comprising:
   a processor; and
   a non-transitory computer-readable storage medium storing instructions that, when executed by the processor, cause the apparatus to perform a method for inserting repeaters in an integrated circuit (IC) design, the method comprising:
   placing a first snapping region in the IC design, wherein the first snapping region includes a predetermined arrangement of feasible grid regions and blocked grid regions, and wherein repeaters are allowed to be placed in feasible grid regions but not in blocked grid regions; and
   iteratively performing a set of operations, comprising:
   selecting a net from a set of nets;
   determining an initial location for inserting a repeater in the net;
   identifying an unoccupied feasible grid region in the first snapping region that is closest to the initial location; and
   inserting a repeater in the net in the unoccupied feasible grid region.

9. The apparatus of claim 8, wherein the set of nets represent a bus interconnect in the IC design.

10. The apparatus of claim 9, wherein the first snapping region is placed where the bus interconnect is routed.

11. The apparatus of claim 8, wherein the unoccupied feasible grid region is treated as a blocked grid region in subsequent iterations.

12. The apparatus of claim 11, wherein the method further comprises placing a second snapping region that at least partially overlaps with the first snapping region, and wherein all feasible grid regions in the second snapping region that overlap with the unoccupied feasible grid region in the first snapping region are treated as blocked grid regions in subsequent iterations.

13. The apparatus of claim 8, wherein the net is split into a first net and a second net, wherein the first net is electrically connected to an input of the repeater, and wherein the second net is electrically connected to an output of the repeater.

14. The apparatus of claim 13, wherein the first snapping region is placed in a channel that does not overlap with macros in the IC design.

15. A method for inserting repeaters in an integrated circuit (IC) design, the method comprising:
   placing a first snapping region in the IC design, wherein the first snapping region includes a predetermined arrangement of feasible grid regions and blocked grid regions, and wherein repeaters are allowed to be placed in feasible grid regions but not in blocked grid regions; and
   iteratively performing a set of operations, comprising:
   selecting a net from a set of nets;
   determining an initial location for inserting a repeater in the net;
   identifying an unoccupied feasible grid region in the first snapping region that is closest to the initial location; and
   inserting a repeater in the net in the unoccupied feasible grid region.

16. The method of claim 15, wherein the set of nets represent a bus interconnect in the IC design.

17. The method of claim 16, wherein the first snapping region is placed where the bus interconnect is routed.

18. The method of claim 15, wherein the unoccupied feasible grid region is treated as a blocked grid region in subsequent iterations.

19. The method of claim 18, wherein the method further comprises placing a second snapping region that at least partially overlaps with the first snapping region, and wherein all feasible grid regions in the second snapping region that overlap with the unoccupied feasible grid region in the first snapping region are treated as blocked grid regions in subsequent iterations.

20. The method of claim 15, wherein the net is split into a first net and a second net, wherein the first net is electrically connected to an input of the repeater, and wherein the second net is electrically connected to an output of the repeater.

* * * * *